(12) United States Patent
Han et al.

(10) Patent No.: US 10,864,487 B1
(45) Date of Patent: Dec. 15, 2020

(54) SAND-MIXING EQUIPMENT

(71) Applicant: AMERICAN JEREH INTERNATIONAL CORPORATION, Houston, TX (US)

(72) Inventors: Maomao Han, Yantai (CN); Shuwei Li, Yantai (CN); Weiwei Liu, Yantai (CN); Mingsheng Li, Yantai (CN); Xiangxiang Ren, Yantai (CN); Changli Li, Yantai (CN); Binggang Yang, Yantai (CN)

(73) Assignee: American Jereh International Corporation, Houston, TX (US)

( * ) Notice: Subject to any disclaimer, the term of this patent is extended or adjusted under 35 U.S.C. 154(b) by 0 days.

(21) Appl. No.: 16/932,342

(22) Filed: Jul. 17, 2020

(30) Foreign Application Priority Data

May 28, 2020 (CN) .......................... 2020 1 0469449

(51) Int. Cl.

| | |
|---|---|
| *B01F 3/00* | (2006.01) |
| *B01F 3/12* | (2006.01) |
| *B01F 15/06* | (2006.01) |
| *B01F 15/02* | (2006.01) |
| *B01F 13/00* | (2006.01) |
| *B01F 15/00* | (2006.01) |

(52) U.S. Cl.
CPC ........ *B01F 3/1271* (2013.01); *B01F 13/0037* (2013.01); *B01F 13/0045* (2013.01); *B01F 15/00538* (2013.01); *B01F 15/0243* (2013.01); *B01F 15/0283* (2013.01); *B01F 15/065* (2013.01); *B01F 2015/061* (2013.01); *B01F 2215/0081* (2013.01)

(58) Field of Classification Search
CPC .......... B01F 13/0037; B01F 2215/0081; B01F 3/1271; B01F 13/0045; B01F 15/00538; B01F 15/0243; B01F 15/0283; B01F 15/065; B01F 2015/061
See application file for complete search history.

(56) References Cited

U.S. PATENT DOCUMENTS

| | | | |
|---|---|---|---|
| 2015/0252661 A1* | 9/2015 | Glass | .................... E21B 43/267 166/308.1 |
| 2015/0322761 A1* | 11/2015 | Hodgson | ............. B01F 15/0234 166/308.1 |

* cited by examiner

*Primary Examiner* — Anshu Bhatia

(57) ABSTRACT

The present invention discloses a novel sand mixing device, including an electric motor and a hydraulic system, wherein the electric motor is used as the power source of the hydraulic system, and the hydraulic system drives all the actuating elements in the sand mixing device. Beneficial effects: in the present invention, the traditional diesel engine drive mode is changed into a motor drive mode and a hydraulic system is maintained, and the power is all in the form of an electro-hydraulic system, realizing the advantages of environmental protection and energy saving with the electric motors as the power source, also taking into account the advantages of small size and flexible layout of the drive parts of the hydraulic system. Therefore, the issues of not environmental-friendly, large size, inconvenient transportation, well site layout, and maintenance in the application of traditional sand mixing device can be addressed.

8 Claims, 1 Drawing Sheet

SAND-MIXING EQUIPMENT

TECHNICAL FIELD

The present invention relates to the technical field of sand mixing devices used in the exploitation of oil-gas field, and specifically relates to a novel sand mixing device.

BACKGROUND

Currently, in the fracturing stimulation of oil-gas field, a sand mixing device is the core equipment of the fracturing unit, which is mainly used to mix the fracturing base fluid, proppants, and chemical additives supplied from upstream, and to supply the mixed fracturing fluid to the downstream pumping equipment.

The current sand mixing device is mainly realized through the following ways in practical applications:

(1) It is mainly driven by diesel engine. The diesel engine drive equipment has many disadvantages: (a) Large volume and complex structure: A diesel engine system includes an air intake system, an exhaust system, a heating system, a fuel system, a cooling system, etc. Therefore it has a complex structure and occupies a large space; (b) Non-Environmental-friendly: During operation on a well site, the sand mixing device driven by the diesel engine would generate engine exhaust and noise to severely affect the normal life of nearby residents. Moreover, there is a risk of leakage of fuel oil, engine oil, antifreeze, and the like, which will cause some degree of pollution to the environment. (c) Non-economical: The sand mixing device driven by the diesel engine requires relatively high initial purchase cost and incurs high fuel consumption cost for unit power during operations, and the power system also requires very high cost on routine maintenance.

(2) The sand mixing device is driven solely by electricity, that is, all the actuating elements in the sand mixing device are driven by electric motors. Each actuating element is driven by an individual electric motor. There are multiple electric motors on the whole sand mixing device. Some actuating elements require high power, correspondingly the requirement on the driving power of electric motors is also high. Large power of electric motors results in large volume, thus causing the following issues: no matter there are multiple electric motors, or there is a single high-power electric motor, it will bring great difficulties to the overall layout of the sand mixing device. To realize full electric drive, a large structural space is often compromised, finally resulting in larger overall size and weight of the sand mixing device, which is not facilitate for the transportation and layout of the well site. Furthermore, due to the space limitation, the overall maintenance of the sand mixing device is also not convenient.

SUMMARY

To overcome the defects of the prior art, an objective of the present invention is to provide a novel sand mixing device, in which the traditional diesel engine drive mode is changed into a motor drive mode and a hydraulic system is maintained, and the power is all in the form of an electro-hydraulic system, realizing the advantages of environmental protection and energy saving with the electric motors as the power source, also taking into account the advantages of small size and flexible layout of the drive parts of the hydraulic system. Therefore, the issues of not environmental-friendly, large size, inconvenient transportation, well site layout, and maintenance in the application of traditional sand mixing device can be addressed.

The objective of the present invention is achieved by the following technical scheme: A novel sand mixing device, including an electric motor and a hydraulic system, the electric motor is used as the power source of the hydraulic system, and the hydraulic system drives all the actuating elements in the sand mixing device.

Further, there are two or more electric motors.

Further, the electric motors are variable-frequency integrated electric motors.

Further, the sand mixing device includes a discharge centrifugal pump, a suction centrifugal pump, a mixing system, a sand conveyor and a bearing device, the discharge centrifugal pump, the suction centrifugal pump, the mixing system and the sand conveyor are integrated on the bearing device, and the electric motors and the hydraulic system are also integrated on the bearing device.

Further, the bearing device is a semitrailer, or a vehicle, or a skid.

Further, a pneumatic system is integrated on the bearing device.

Further, the sand mixing device is under local control and/or under remote control.

Further, the sand mixing device includes a liquid adding system, a solid adding system, a cooling system and a manifold system, the manifold system is set at both sides of the length direction of the bearing device, the sand conveyor is set at one end of the length direction of the bearing device, the mixing system and the sand conveyor are arranged adjacent to each other, the solid adding system is set above the mixing system, the liquid adding system and the solid adding system are arranged adjacent to each other, the discharge centrifugal pump and the suction centrifugal pump are set in the manifold system, the electric motors and the cooling system are set at the other end of the length direction of the bearing device, the cooling system is set above the electric motors, and the hydraulic system and the electric motors are arranged adjacent to each other.

Compared with the prior art, the beneficial effects of the present invention are as follows: In the technical scheme of the present invention, the traditional diesel engine drive mode is changed into a motor drive mode and a hydraulic system is maintained, and the power is all in the form of an electro-hydraulic system, realizing the advantages of environmental protection and energy saving with the electric motors as the power source, also taking into account the advantages of small size and flexible layout of the driving motors of the hydraulic system. Therefore, the issues of unfriendly environment, large size, inconvenient transportation, well site layout, and maintenance in the application of traditional sand mixing device can be addressed. Electric motors are employed to drive the hydraulic system instead of being driven by traditional diesel engines or solely by electricity. Compared with diesel engines, electric motors are more environmentally friendly and energy-saving. Compared with being driven solely by electricity, the mode of an electro-hydraulic system reduces the number of electric motors, thus greatly saving the space occupied by multiple electric motors, reducing the size and weight of the whole sand mixing device to facilitate the transportation and layout of the well site, and the simple structure of the whole sand mixing device is beneficial for its overall maintenance. The electric motors are variable-frequency integrated electric motors, on which variable-frequency units are directly integrated, without the need of additional variable-frequency units, saving the space they occupied, and effectively utilizing the space of electric motors, thus optimizing the size of the whole sand mixing device, simultaneously avoiding the risk caused by the failure of the cooling system of independent variable-frequency units.

The present invention will be described below in detail with reference to the accompanying drawings and specific implementations.

Wherein, 1. Cooling system, 2. Hydraulic system, 3. Control room, 4. Liquid adding system, 5. Solid adding system, 6. Sand conveyor, 7. Mixing system, 8. Discharge centrifugal pump, 9. Discharge manifold, 10. Transfer case, 11. Bearing device, 12. Electric motor, 13. Suction centrifugal pump, 14. Suction manifold.

DESCRIPTION OF THE IMPLEMENTATIONS

Figure 1:
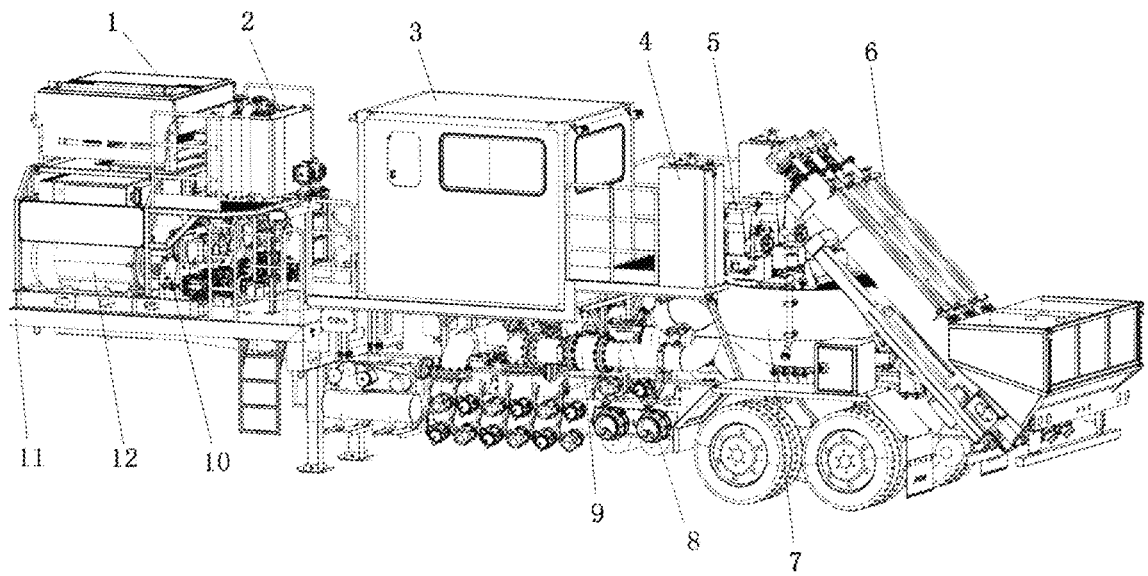
FIG. 1 is a schematic structural diagram of the novel sand mixing device according to an embodiment of the present invention.
Figure 2:
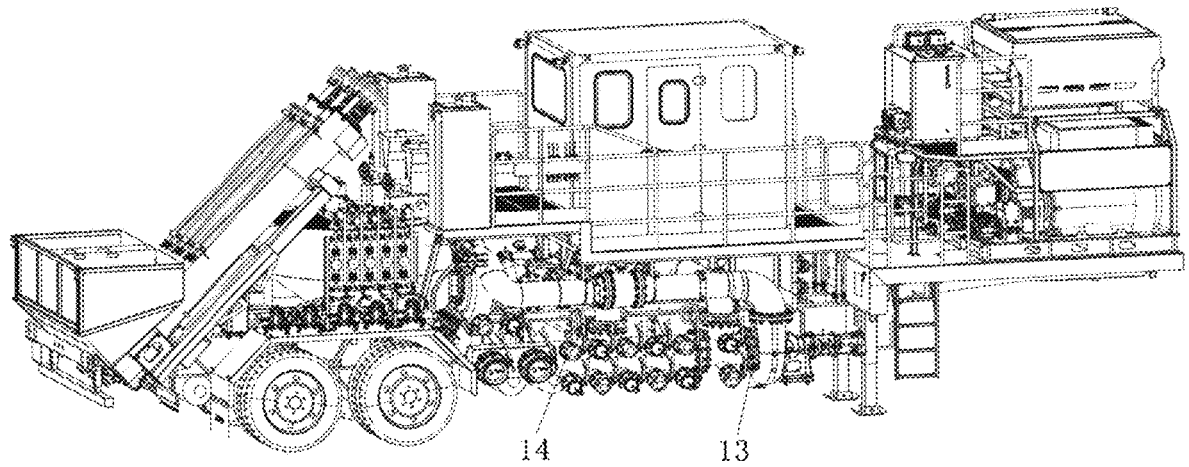
FIG. 2 is a schematic structural diagram of another side of the novel sand mixing device according to an embodiment of the present invention.

As shown in FIGS. 1 to 2, a novel sand mixing device, including an electric motor 12 and a hydraulic system 2. There is only one electric motor 12. The electric motor 12 is used as the power source of the hydraulic system 2, and the hydraulic system 2 drives all the actuating elements in the sand mixing device. The actuating elements in the sand mixing device include: a suction centrifugal pump 13, a discharge centrifugal pump 8, a liquid adding pump in the liquid adding system, a stirrer in the blending tank, a sand conveyor 6, a solid adding system and a cooling system. Compared with the prior art using the diesel engine as the power source, an electric motor 12 is used as the power source in the present technical scheme, avoiding the disadvantages of diesel engine drive and exhibiting the advantages of small size, convenient transportation, no exhaust and noise pollution, economic, and low cost on maintenance. Compared with pure electric drive in the prior art, in the present technical scheme, the traditional diesel engine drive mode is changed into a motor drive mode (driven by an electric motor 12) and a hydraulic system 2 is maintained, and the power is all in the form of an electro-hydraulic system, realizing the advantages of environmental protection and energy saving with the electric motor 12 as the power source, also taking into account the advantages of small size and flexible layout of the driving motors of the hydraulic system 2, so that the sand mixing device can be further miniaturized and lightweight.

The electric motor 12 is a variable-frequency integrated electric motor. The variable-frequency units are directly integrated on the electric motor 12, without the need of additional variable-frequency units, effectively utilizing the space of the electric motor 12, thus optimizing the size of the whole sand mixing device, simultaneously avoiding the risk caused by the failure of the cooling system of independent variable-frequency units.

The sand mixing device includes a discharge centrifugal pump 8, a suction centrifugal pump 13, a mixing system 7, a sand conveyor 6 and a bearing device 11 The discharge centrifugal pump 8, the suction centrifugal pump 13, the mixing system 7 and the sand conveyor 6 are integrated on the bearing device 11. The electric motor 12 and the hydraulic system 2 are also integrated on the bearing device 11.

The bearing device 11 is a semitrailer, or a vehicle, or a skid. A variety of bearing forms can be flexibly selected to meet the actual use requirements of customers to a greater extent.

A pneumatic system is integrated on the bearing device 11. The connection between each pipeline in the sand mixing device is controlled by the valves. The valve type that is commonly used on the sand mixing device is a pneumatic valve. Therefore, a pneumatic system, such as an air compressor, can supply power for the pneumatic valve.

The sand mixing device is under local control and/or under remote control. When local control is needed, a control room 3 can be arranged at the middle position along the length direction of the bearing device 11, or a control box can be arranged on the bearing device 11. The sand mixing device is connected to a remote control system through the control box to realize the remote control.

The sand mixing device includes a liquid adding system 4, a solid adding system 5, a cooling system 1 and a manifold system. The manifold system is set at both sides of the length direction of the bearing device 11. The sand conveyor 6 is set at one end of the length direction of the bearing device 11. The mixing system 7 and the sand conveyor 6 are arranged adjacent to each other. The solid adding system 5 is set above the mixing system 7. The liquid adding system 4 and the solid adding system 5 are arranged adjacent to each other. The liquid adding system 4 includes multiple liquid adding pumps, which are distributed above the bearing device 11 and close to both sides of the bearing device 11.

The discharge centrifugal pump 8 and the suction centrifugal pump 13 are set in the manifold system. The electric motor 12 and the cooling system 1 are set at the other end of the length direction of the bearing device 11. The cooling system 1 is set above the electric motor 12. The hydraulic system 2 and the electric motor 12 are arranged adjacent to each other. The electric motor 12 is connected to the hydraulic system 2 through a transfer case 10. Each electric motor 12 corresponds to an individual transfer case 10.

The mixing system 7 is a blending tank. The sand outlet of the sand conveyor 6 is located above the blending tank. The discharge port of the solid adding system 5 is directly aligned with the inlet of the blending tank. The manifold system includes a suction manifold 14 and a discharge manifold 9, which are set at two sides of the length direction of the bearing device 11, respectively. A suction centrifugal pump 13 is connected to the suction manifold 14, and a discharge centrifugal pump 8 is connected to the discharge manifold 9. The discharge end of the liquid adding system 4 is directly connected into the blending tank or the suction manifold 14. The blending tank is composed of two parts, a tank and a stirrer, in which the charged fracturing base fluid, proppants, and chemical additives can be thoroughly mixed and stirred to form a fracturing fluid.

Working principle: The fracturing base fluid is sucked from an upstream liquid supply equipment by the suction centrifugal pump 13 through the suction manifold 14 and fed into the mixing system 7. The proppants are added into the mixing system 7 through the sand conveyor 6. Dry powder additives are fed into the mixing system 7 through the solid adding system 5, or other liquid additives are fed into the mixing system 7 through the liquid adding system 4. The fracturing base fluid, proppants, and chemical additives are mixed with the stirrer in the mixing system 7 to form a fracturing fluid, which is pressurized through the discharge centrifugal pump 8 and then fed into the downstream equipment through the discharge manifold 9.

It will be appreciated to persons skilled in the art that the present invention is not limited to the foregoing embodiments, which together with the context described in the specification are only used to illustrate the principle of the present invention. Various changes and improvements may be made to the present invention without departing from its spirit and scope. All these changes and improvements shall fall within the protection scope of the present invention, which is defined by the appended claims and equivalents thereof.

What is claimed is:

1. A novel sand mixing device, comprising an electric motor and a hydraulic system, the electric motor is used as the power source of the hydraulic system, and the hydraulic system drives all the actuating elements in the sand mixing device, and
    wherein there are two or more electric motors, and
    wherein the sand mixing device comprises a discharge centrifugal pump, a suction centrifugal pump, a mixing system, a sand conveyor and a bearing device, the discharge centrifugal pump, the suction centrifugal pump, the mixing system and the sand conveyor are integrated on the bearing device, and the electric motors and the hydraulic system are also integrated on the bearing device, and
    wherein the sand mixing device comprises a liquid adding system, a solid adding system, a cooling system and a manifold system, the manifold system is set at both sides of the length direction of the bearing device, the sand conveyor is set at one end of the length direction of the bearing device, the mixing system and the sand conveyor are arranged adjacent to each other, the solid adding system is set above the mixing system, the liquid adding system and the solid adding system are arranged adjacent to each other, the discharge centrifugal pump and the suction centrifugal pump are set in the manifold system, the electric motors and the cooling system are set at the other end of the length direction of the bearing device, the cooling system is set above the electric motors, and the hydraulic system and the electric motors are arranged adjacent to each other.

2. The novel sand mixing device according to claim 1, wherein the bearing device is a semitrailer, or a vehicle, or a skid.

3. The novel sand mixing device according to claim 2, wherein a pneumatic system is integrated on the bearing device.

4. The novel sand mixing device according to claim 2, wherein the sand mixing device is under local control and/or under remote control.

5. A novel sand mixing device, comprising an electric motor and a hydraulic system, the electric motor is used as the power source of the hydraulic system, and the hydraulic system drives all the actuating elements in the sand mixing device, and
    wherein the electric motors are variable-frequency integrated electric motors, and
    wherein the sand mixing device comprises a discharge centrifugal pump, a suction centrifugal pump, a mixing system, a sand conveyor and a bearing device, the discharge centrifugal pump, the suction centrifugal pump, the mixing system and the sand conveyor are integrated on the bearing device, and the electric motors and the hydraulic system are also integrated on the bearing device, and
    wherein the sand mixing device comprises a liquid adding system, a solid adding system, a cooling system and a manifold system, the manifold system is set at both sides of the length direction of the bearing device, the sand conveyor is set at one end of the length direction of the bearing device, the mixing system and the sand conveyor are arranged adjacent to each other, the solid adding system is set above the mixing system, the liquid adding system and the solid adding system are arranged adjacent to each other, the discharge centrifugal pump and the suction centrifugal pump are set in the manifold system, the electric motors and the cooling system are set at the other end of the length direction of the bearing device, the cooling system is set above the electric motors, the hydraulic system and the electric motors are arranged adjacent to each other.

6. The novel sand mixing device according to claim 5, wherein the bearing device is a semitrailer, or a vehicle, or a skid.

7. The novel sand mixing device according to claim 6, wherein a pneumatic system is integrated on the bearing device.

8. The novel sand mixing device according to claim 6, wherein the sand mixing device is under local control and/or under remote control.

* * * * *